United States Patent [19]

Chiao et al.

[11] 4,450,261

[45] May 22, 1984

[54] PREPARATION OF LOW MOLECULAR WEIGHT STYRENE-MALEIC ANHYDRIDE COPOLYMERS AND SULFONATED COPOLYMERS THEREOF

[75] Inventors: Wen B. Chiao, Piscataway; Dilip K. Ray-Chaudhuri, Bridgewater, both of N.J.

[73] Assignee: National Starch and Chemical Corporation, Bridgewater, N.J.

[21] Appl. No.: 468,256

[22] Filed: Feb. 22, 1983

[51] Int. Cl.$^3$ .............................. C08F 2/38; C08F 8/36; C08F 236/10

[52] U.S. Cl. ................................. 526/214; 526/224; 526/272; 525/353

[58] Field of Search ................. 526/214, 224; 525/353

[56] References Cited

U.S. PATENT DOCUMENTS

| | | | |
|---|---|---|---|
| 2,606,891 | 8/1952 | Rowland | 526/214 |
| 2,635,090 | 4/1953 | Basdekis | 526/214 |
| 3,072,619 | 1/1963 | Turbak | 260/79.3 |
| 3,085,994 | 4/1963 | Muskat | 260/78.5 |
| 3,388,109 | 6/1968 | Hawkins | 526/214 |
| 3,730,900 | 5/1973 | Perricone et al. | 252/8.5 |
| 3,960,824 | 6/1976 | Hicks | 526/214 |

*Primary Examiner*—Joseph L. Schofer
*Assistant Examiner*—Peter F. Kulkosky
*Attorney, Agent, or Firm*—Edwin Szala; Lori Tolly

[57] ABSTRACT

Styrene and maleic anhydride monomers are copolymerized in 1,2-dichloroethane employing 3-mercaptopropionic acid or methyl-3-mercaptopropionate chain transfer agents producing an odorless copolymer in the molecular weight range of about 500 to 10,000 which remains soluble in the solvent. The resultant copolymer may be conveniently sulfonated in the 1,2-dichloroethane solvent used for the polymerization thereby producing an odorless sulfonated copolymer.

19 Claims, No Drawings

PREPARATION OF LOW MOLECULAR WEIGHT STYRENE-MALEIC ANHYDRIDE COPOLYMERS AND SULFONATED COPOLYMERS THEREOF

This invention relates to an improved process for preparing a copolymer of styrene and maleic anhydride monomers in the molecular weight range of about 500 to 10,000 in a solvent. Upon completion of the polymerization reaction, the copolymer can thereafter be sulfonated in the solvent used in the polymerization reaction in a continuous process to yield the corresponding sulfonated copolymer.

The copolymerization of styrene and maleic anhydride is well known in the art. See, for example, U.S. Pat. Nos. 2,675,370; 3,085,994; 3,178,395; and 3,730,900. A process of precipitation polymerization may be employed whereby a solvent is chosen for the reaction which is inert to the polymerization reaction conditions and in which both reactants are soluble. The reactants polymerize at a concentration of about 10 to 50% in the solvent at elevated temperatures. Various free radical generating catalysts including organic peroxides and azo compounds are employed for the polymerization. After the polymerization is complete and the mixture is cooled, the resultant copolymer precipitates from the selected solvent and is recovered by filtration and then dried. Various solvents which have been used in precipitation polymerization include toluene, benzene, and xylene. A polymerization process yielding copolymers which remain soluble in the polymerization solvent may also be achieved employing similar reaction conditions. Acceptable solvents for this process include ketones and esters such as acetone, methyl ethyl ketone and butyl acetate, dioxane, carbon tetrachloride and 1,2-dichloroethane. In order to prepare a copolymer of sufficiently low molecular weight to render it soluble in these solvents, a chain transfer agent must be used.

The preparation of sulfonated styrene-maleic anhydride copolymers is also known. In U.S. Pat. No. 3,072,619 the sulfonation reaction involves uniformly dissolving styrene-maleic anhydride copolymer in a liquid chlorinated aliphatic hydrocarbon and then treating the solution with a sulfur trioxide-organic complex. The sulfonated copolymer precipitates from solution and is thus easily recoverable by conventional techniques such as decanting, filtering, or centrifuging. Suitable solvents for the sulfonation reaction include methylene chloride, carbon tetrachloride, 1,2-dichloroethane.

In order to obtain copolymers of low molecular weight, various conventional solvents which possess chain-terminating capabilities, e.g. alkyl substituted aromatic organic compounds in which the alkyl substituent provides an active hydrogen atom (cumene and cymene), are used in the polymerization process. See U.S. Pat. Nos. 3,085,994; 3,388,106; and 3,451,979 describing the precipitation polymerization of styrene and maleic anhydride.

In some instances, however, conventional solvents with chain-terminating capabilities may be inadequate in preparing such low molecular weight copolymers and use of chain transfer agents, as mentioned above, is required. A variety of chain transfer agents, for example, polyhalides, disulfide compounds, and mercaptans are known in the literature. While various mercaptans are known to regulate molecular weight distribution efficiently producing uniform products, mercaptans possess an undesirable strong odor which most often remains with the polymerized end-product. In U.S. Pat. No. 2,606,891, Rowland describes the use of mercaptans containing 5 to 12 carbon atoms as effective chain transfer agents in styrene-maleic anhydride polymerization reactions. Mercaptan levels of 5 to 25% based on the weight of the monomers are suggested for the reaction. While the most efficient mercaptans are those of low molecular weight, Rowland does not suggest use of $C_1$ to $C_4$ mercaptans due to their undesirable strong odor.

It should be noted that when a mercaptan of increasing chain length is used in the polymerization reaction, proportionately more will be required to produce a low molecular weight copolymer due to the decreasing efficiency of the mercaptan. As the chain length of a mercaptan decreases, less mercaptan will be required to produce a similar low molecular weight copolymer. Unfortunately, the copolymer will be expected to possess an objectionable mercaptan odor if the mercaptan contains less than 5 carbon atoms. Therefore, in order to avoid the odor problem created by short chain mercaptans, larger quantities of less efficient long chain mercaptans must be employed in the polymerization reaction.

In spite of the abundant general teachings directed to preparing low molecular weight copolymers of styrene and maleic anhydride employing chain-terminating solvents and chain transfer agents, no process is known for producing such copolymers conveniently and efficiently with short chain mercaptans where the resultant copolymer possesses a minimum or imperceptible amount of odor. Because of the increased efficiency afforded by short chain mercaptans in the polymerization reaction mentioned above, a process for the production of styrene-maleic anhydride copolymers is desired using such mercaptans where the end-products possess no odor problem.

It is an object of this invention to provide a process for preparing a copolymer of styrene or substituted styrene and maleic anhydride in a solvent such that the resultant copolymer has a molecular weight in the range of about 500 to 10,000 and is substantially odorless.

It is a further object to provide a convenient and efficient process for preparing a sulfonated copolymer of styrene or substituted styrene and maleic anhydride using the same solvent for the sulfonation as was used for the polymerization, and that the resultant sulfonated copolymer be substantially odorless.

These and other related objects will be apparent from the description which follows.

SUMMARY OF THE INVENTION

The above and related objects are achieved in an improved process wherein selected styrene and maleic anhydride monomers are polymerized in a solvent of 1,2-dichloroethane using 3-mercaptopropionic acid or methyl-3-mercaptopropionate as chain transfer agents. The copolymer contemplated herein ordinarily will have a styrene to maleic anhydride molar ratio ranging from about 1:1 to 9:1 with the preferred ratio ranging from 1:1 to 3:1. The molecular weight of the copolymer herein will range from about 500 to 10,000 and preferably 1,000 to 4,000. The resultant low molecular weight styrene-maleic anhydride copolymer does not precipitate, but remains soluble in 1,2-dichloroethane and can thereafter be conveniently sulfonated by conventional methods. Unexpectedly, both the styrene-maleic anhydride copolymer as well as the sulfonated copolymer are substantially odorless.

The styrene or substituted monomers useful in the invention include styrene, α-methyl styrene, and vinyl toluene. For purposes of this invention where styrene is mentioned hereafter in the specification and claims the term is intended to include styrene and the mentioned substituted styrenes.

In one aspect, the present invention provides an efficient process for preparing styrene-maleic anhydride copolymers. Moreover, due to the solubility of the copolymer in 1,2-dichloroethane, the present invention offers a convenient and step-saving process for producing sulfonated copolymers with the elimination of intermediate recovery, purification, and handling steps involved in the general styrene-maleic anhydride polymerization process before the sulfonation reaction.

The preferred amount of 3-mercaptopropionic acid and methyl-3-mercaptopropionate used is about 0.5–5% by weight based on the weight of the monomers, with the most preferred amount being from about 1–3% based on the weight of the monomers. It should be noted that mixtures of these specified mercaptans may also be employed in the amounts mentioned above in the polymerization reaction.

DESCRIPTION OF THE PREFERRED EMBODIMENTS

The polymerization reaction of the present invention will require a free-radical generating catalyst to initiate the reaction. Suitable catalysts in accordance with the process include many organic peroxides, for example, benzoyl peroxide, acetone peroxide, and cumene hydrogen peroxide, and azo compounds such as azoisobutyronitrile and 2,2'-azobis (2-methyl-pentanenitrile). The use of azoisobutyronitrile or 2,2'-azobis (2-methyl-pentanenitrile) in an amount of about 4–6% based on the weight of the styrene and maleic anhydride monomers is preferred.

The monomers should be polymerized in sufficient 1,2-dichloroethane to insure adequate monomer dispersion and to maintain the final copolymer in solution. The monomers will polymerize satisfactorily in 1,2-dichloroethane at a concentration of about 10 to 50% in the solvent. The reaction is preferably conducted at a monomer concentration of about 20% in the solvent.

The amount of mercaptan chain transfer agent employed in the polymerization process is largely dependent upon the molar ratio of the monomers. The reactivity of the polymerization increases as the amount of maleic anhydride in the reaction increases, thus rendering larger molecular weight copolymers at a faster rate. Also, due to the polarity maleic anhydride imparts to the copolymer, as the amount of maleic anhydride in the reaction increases, copolymers may be produced which are less soluble in the dichloroethane solvent. Therefore, when larger amounts of maleic anhydride are employed (e.g., when the monomer ratio of styrene to maleic anhydride is 1:1 or 2:1), the amount of mercaptan used should be increased in order to provide a lower molecular weight copolymer which will remain soluble in the solvent. It is noted in the examples that when styrene and maleic anhydride were polymerized in 1,2-dichloroethane with 2%, based on the weight of the monomers, of 3-mercaptopropionic acid chain transfer agent, the resultant copolymer was insoluble in 1,2-dichloroethane. When 3% of the mercaptan was employed, the resultant copolymer had a molecular weight sufficiently low enough to remain in solution. It is therefore noted that consideration should be taken when determining the amount of mercaptan to be used in the polymerization reaction to insure solubility. When a copolymer with a 1:1 ratio of styrene to maleic anhydride is to be made, a minimum amount of about 3% mercaptan should be employed to insure solubility. When a copolymer with a 9:1 ratio of styrene to maleic anhydride is to be made, as little as 0.5% mercaptan may be required.

As will be recognized by those skilled in the art, the copolymerization reaction may be conducted in any number of ways. Styrene, maleic anhydride, and the mercaptan chain transfer agent may be simultaneously added at slow rates to a reaction vessel containing 1,2-dichloroethane and catalyst at reflux with agitation. The monomers and mercaptans may be dissolved first in 1,2-dichloroethane, if desired. An alternative polymerization method would be to simulataneously add only one monomer and mercaptan at slow rates to a reaction vessel which already contains the other monomer and catalyst in 1,2-dichloroethane. The polymerization temperature in 1,2-dichloroethane is about 70°–100° C. with polymerization preferably conducted between 80°–95° C. The polymerization reaction procedes rapidly at elevated temperatures; therefore, a uniform reaction may only be achieved by slow addition of the monomers such that the rate of addition does not exceed the rate of conversion of the monomer to polymer. In the laboratory, the addition takes place over a period of approximately 4 to 8 hours. After the addition is complete, the reaction is held at reflux for an additional 1 to 2 hours to insure completion of the polymerization. The reaction should also be conducted in an oxygen-free atmosphere.

Upon completion of the polymerization reaction, the solution is cooled and the resultant copolymer with a molecular weight range of 500 to 10,000 will remain in solution in 1,2-dichloroethane and be substantially odorless. The copolymer may thereafter be conveniently sulfonated as is, eliminating intermediate recovery and handling steps. If a sulfonated copolymer is not desired, the copolymer may be recovered after polymerization by conventional techniques such as dichloroethane distillation or by addition of a non-solvent for the copolymer including various aliphatic or aromatic hydrocarbon solvents which precipitate the copolymer.

The copolymer may be sulfonated by a variety of methods known to those skilled in the art. Generally, a sulfonating agent is added on an equimolar basis with the styrene concentration of the copolymer in order to monosubstitute each aromatic ring. Sulfur trioxide or other sulfur-containing materials capable of rendering $SO_3$ available for sulfonating can be used. Use of sulfur trioxide as the sulfonating agent is preferred. In order to prevent undesirable cross-linking of the aromatic rings of the copolymer and to reduce the exothermic reactivity of the reagent, the use of a complex of sulfur trioxide and an organic compound is suggested. See U.S. Pat. No. 3,072,619 which describes the use of such $SO_3$-organic complexes. Sulfur trioxide and/or the complexed sulfur trioxide may be dissolved in 1,2-dichloroethane and then reacted with the copolymer by any conventional addition procedure. The sulfonation reaction should be conducted under anhydrous conditions with cooling to temperatures of 0° to 50° C. and preferably from 10° to 30° C. As the sulfonation proceeds, the sulfonated polymer will precipitate from solution.

Upon completion of the sulfonation reaction, the sulfonated copolymer should be neutralized sufficiently with an appropriate base, e.g. sodium carbonate, in order to stabilize the acidic sulfonated copolymer. After neutralization, the product may be recovered by conventional means including decanting, filtration, or centrifuging. If desired, water may be added directly to the dichloroethane solution containing the precipitated sulfonated copolymer without neutralization, whereby the water-soluble copolymer in free acid form can be phase separated from the organic dichloroethane phase. In both cases, residual trace amounts of dichloroethane may be removed by distillation.

One skilled in the art should ascertain the essential character of this invention and without departing from its spirit and scope be able to make variations and modifications of the invention to suit various usages and conditions.

The following examples will further illustrate the embodiments of the present invention. In the examples, all parts and percentages are given by weight and all temperatures are in degrees Celsius unless otherwise noted.

INTRINSIC VISCOSITY MEASUREMENT

The measurement of intrinsic viscosity (I.V.) of polymers is used in order to determine the relative molecular weights of such polymers. The intrinsic viscosity of the styrene-maleic anhydride copolymers of the present invention is measured employing the following test procedure.

Polymer solutions in dichloroethane in concentrations of approximately 5 g/dl, 2.5 g/dl, and 1.25 g/dl are prepared. If the polymers are insoluble in 1,2-dichloroethane, tetrahydrofuran is used as a suitable solvent. The flow rate ($t_c$) of each polymer solution is measured as well as that of a solvent blank ($t_o$) at 25° C. with a Cannon-Fenske viscometer. The reduced viscosity ($\eta_{red}$) of the polymer solutions is calculated by the following equation:

$$\eta\ red = \frac{t_c/t_o - 1}{c}$$

where $t_c$=flow rate of polymer solution in seconds and c=actual concentration of polymer solution in g/dl. The reduced viscosity values are then plotted versus the polymer concentrations of the solutions. The I.V. of a polymer is obtained by extrapolating the line of the graph to c=0. Thus I.V.=$\eta_{red}$ at c=0. As a useful approximation, an I.V. of 0.05 correlates to a molecular weight of 1,500 and an I.V. of 0.09 correlates to a molecular weight of 7,000.

EXAMPLE 1

This example demonstrates the effectiveness of 3-mercaptopropionic acid and methyl-3-mercaptopropionate as chain transfer agents in the process of this invention. A series of styrene-maleic anhydride (1:1) copolymers were prepared using various mercaptan chain transfer agents.

A mixture of 400 grams of 1,2-dichloroethane (DCE) and 4 grams of azoisobutyronitrile (AIBN) were charged to a two-liter multiple-neck round bottom flask equipped with a stirrer, thermometer, condenser, addition funnels and nitrogen inlet. With constant agitation, the mixture was heated to reflux (about 85° C.) under nitrogen sweep and held at reflux for five minutes. Using three addition funnels, a mixture of 820 grams of DCE and 196 grams of maleic anhydride (2.0 mole); 208 grams of styrene (2.0 mole); and a mixture of 200 grams of DCE, 20 grams of AIBN and an appropriate amount of mercaptan specified in Table 1 were simultaneously added over a period of six hours at reflux. Upon completion of the slow addition, the mixture was refluxed for an additional one hour before cooling. The following data was recorded as found in Table 1.

It is evident that only the copolymer samples G and H made with 3% of 3-mercaptopropionic acid and methyl-3-mercaptopropionate produced low molecular weight polymers (low I.V.) which remained in solution and possessed very weak mercaptan odors. Copolymer F, made with only 2% of 3-mercaptopropionic acid, possessed only a low mercaptan odor; however, the molecular weight of the copolymer was not sufficiently low enough to render it soluble in DCE. The only other soluble copolymer (sample E) possessed an unacceptably high mercaptan odor.

EXAMPLE 2

This example illustrates the preparation of a 3:1 styrene-maleic anhydride copolymer using 3-mercaptopropionic acid as the chain transfer agent. A mixture of 312 grams of styrene, 15 grams of maleic anhydride and 720 grams of DCE were charged to a two liter multiple-neck round bottom flask equipped with a stirrer, thermometer, condenser, addition funnels and nitrogen inlet. With constant agitation, the mixture was heated to reflux (about 91° C.) under nitrogen sweep. Ten percent (10%) of a mixture of 300 grams of DCE, 16 grams of AIBN and 4 grams of 3-mercaptopropionic acid (0.97% based on weight of monomers) was added to the flask and the mixture was held at reflux for five minutes. The remaining 90% of the mixture was simultaneously added over a 4.25 hour period to the reaction flask with a mixture of 93 grams of maleic anhydride and 300 grams of DCE. At the end of the slow addition, the reflux temperature had dropped to 85° C. The mixture was held at reflux for two hours after addition before cooling. A clear polymer solution without any noticeable mercaptan odor was obtained. The I.V. of the polymer in DCE was 0.076 dl/g.

EXAMPLE 3

The procedure of Example 1 was repeated employing α-methyl styrene and maleic anhydride monomers in a 1:1 molar ratio with 2.3% (based on weight of the monomers) of 3-mercaptopropionic acid as chain transfer agent.

TABLE 1

| MERCAPTAN CHAIN TRANSFER AGENT EFFECT ON STYRENE-MALEIC ANHYDRIDE (1:1) COPOLYMERIZATION | | | | |
|---|---|---|---|---|
| SAMPLE | PERCENT CHAIN TRANSFER AGENT[1] | I.V.[2] | SOLUBILITY IN DCE | MERCAPTAN ODOR |
| A | none | 0.112 | insoluble | — |
| B | 3% dodecyl mercaptan | 0.074 | insoluble | low |
| C | 3% mercaptoacetic acid | 0.086 | insoluble | high |

TABLE 1-continued
MERCAPTAN CHAIN TRANSFER AGENT EFFECT ON STYRENE-MALEIC ANHYDRIDE (1:1) COPOLYMERIZATION

| SAMPLE | PERCENT CHAIN TRANSFER AGENT[1] | I.V.[2] | SOLUBILITY IN DCE | MERCAPTAN ODOR |
|---|---|---|---|---|
| D | 3% 2-mercaptopropionic acid | 0.073 | insoluble | high |
| E | 2% n-butyl mercaptan | 0.061 | soluble | high |
| F | 2% 3-mercaptopropionic acid | 0.072 | insoluble | low |
| G | 3% 3-mercaptopropionic acid | 0.058 | soluble | low |
| H | 3% methyl-3-mercaptopropionate | 0.055 | soluble | low |

[1]Based on weight of monomers.
[2]I.V. (dl/g) is intrinsic viscosity measured in tetrahydrofuran.

The resultant polymer did not possess a noticeable odor and was completely soluble in DCE. The polymer had an I.V. in DCE of 0.053 dl/g.

EXAMPLE 4

Copolymers of vinyl toluene and maleic anhydride in various molar ratios specified in Table 2 were prepared with 3-mercaptopropionic acid as chain transfer agent. Sample J was prepared by the procedure of Example 1. Samples K through O were prepared by the procedure of Example 2. All of the resultant polymer solutions were clear and did not possess any noticeable mercaptan odor.

EXAMPLE 5

This example illustrates the sulfonation of 1:1 styrene maleic anhydride copolymer G in DCE of Example 1.

A five-liter Morton flask equipped with a stirrer, thermometer, addition funnels, condenser with drying tube and a gas inlet adapter was purged with nitrogen for 15 minutes. A mixture of 1125 grams of DCE and 29 grams of triethylphosphate (0.1578 mole) was then added to the flask. With agitation, 12.9 grams of sulfur trioxide (0.1608 mole) was added slowly to form a 1:1 molar complex with the triethylphosphate. The temperature of the mixture was maintained at 15°–20° C. during the addition. Using two addition funnels, 1050 ml of copolymer G solution and 129.6 grams of sulfur trioxide (1.6175 mole) were added simultaneously while maintaining the temperature of 15°–20° C. during the sulfonation. The copolymer solution which contained 300 grams of copolymer (1.5779 mole of styrene in copolymer) in DCE was added at a rate of 15 ml/minute. The sulfur trioxide was added at a rate of 1 ml/minute. The sulfonated polymer precipitated as it formed.

$H_2O$ was added to dissolve the sulfonated polymer. The aqueous layer was separated from DCE with a 2-liter separatory funnel. The residual DCE in the aqueous solution was stripped by rotary evaporation under reduced pressure. The final solution of the polymer in acid form was yellowish and possessed no noticeable mercaptan odor.

EXAMPLE 7 (Comparative)

Copolymer E (1:1 styrene-maleic anhydride copolymer employing n-butyl mercaptan chain transfer agent) of Example 1 was sulfonated as described in Example 5. The resultant polymer possessed a strong objectionable mercaptan odor.

We claim:

1. An improved process for preparing a copolymer of styrene and maleic anhydride in the molecular weight range of about 500 to 10,000 by polymerizing styrene and maleic anhydride monomers in a molar ratio of about 1:1 to 9:1 in 1,2-dichloroethane at 70°–100° C. in the presence of a free radical generating polymerization catalyst and a mercaptan chain transfer agent, wherein the improvement comprises carrying out the polymerization in the presence of about 0.5–5%, based on the weight of the monomers, of 3-mercaptopropionic acid or methyl-3-mercaptopropionate as the chain transfer agent, whereby a substantially odorless copolymer which remains soluble in said 1,2-dichloroethane results.

2. An improved process for preparing a sulfonated copolymer of styrene and maleic anhydride by polymerizing styrene and maleic anhydride monomers in a molar ratio of about 1:1 to 9:1 in 1,2-dichloroethane at 70°–100° C. in the presence of a free radical generating polymerization catalyst and a mercaptan chain transfer

TABLE 2

| SAMPLE | MOLAR RATIO OF VINYL TOLUENE:MALEIC ANHYDRIDE | PERCENT 3-MERCAPTOPROPIONIC ACID[1] | I.V.[2] |
|---|---|---|---|
| J | 1:1 | 2.7 | 0.038 |
| K | 2:1 | 1.4 | 0.069 |
| L | 3:1 | 0.5 | 0.097 |
| M | 3:1 | 0.87 | 0.079 |
| N | 4:1 | 0.86 | 0.072 |
| O | 6.1:1 | 0.85 | 0.076 |

[1]Based on weight of monomers.
[2]I.V. (dl/g) is intrinsic viscosity measured in DCE except for Sample J which was measured in tetrahydrofuran.

After completing the sulfonation, 260 grams of anhydrous sodium carbonate was added to neutralize the polymer. The polymer was filtered and then dried at 60° C. The resultant polymer dissolved completely in water to give a yellowish solution which possessed no noticeable mercaptan odor.

EXAMPLE 6

The procedure of Example 5 was repeated except that after completing the sulfonation, 1500 grams of agent yielding a copolymer in the molecular weight range of about 500 to 10,000, sulfonating the resulting copolymer of styrene and maleic anhydride in said 1,2-dichloroethane, and recovering the resultant precipitated sulfonated copolymer, wherein the improvement comprises carrying out the polymerization in the presence of about 0.5–5%, based on the weight of the monomers, of 3-mercaptopropionic acid or methyl-3-mercaptopropionate as the chain transfer agent, whereby a substantially odorless and soluble copolymer of styrene and maleic anhydride is formed and results in a substantially odorless copolymer after sulfonation.

3. The process of claim 1 wherein the polymerization is conducted between 85°–95° C.

4. The process of claim 1 wherein said chain transfer agent is used in an amount of 1–3% based on the weight of the monomers and the copolymer has a molecular weight of from 1,000 to 4,000.

5. The process of claim 1 wherein said free radical generating polymerization catalyst is azoisobutyronitrile.

6. The process of claim 1 wherein said free radical generating polymerization catalyst is 2,2'-azobis (2-methyl-pentanenitrile).

7. The process of claim 1 wherein said molar ratio of styrene to maleic anhydride is 1:1 to 3:1.

8. The process of claim 1 wherein the styrene is α-methyl styrene.

9. The process of claim 1 wherein the styrene is vinyl toluene.

10. The process of claim 1 wherein the copolymer is recovered by distilling off the dichloroethane solvent.

11. The process of claim 2 wherein the polymerization is conducted between 85°–95° C.

12. The process of claim 2 wherein said chain transfer agent is used in an amount of 1–3% based on the weight of the monomers and the copolymer prior to sulfonation has a molecular weight of from 1,000 to 4,000.

13. The process of claim 2 wherein said free radical generating polymerization catalyst is azoisobutyronitrile.

14. The process of claim 2 wherein said free radical generating polymerization catalyst is 2,2'-azobis (2-methyl-pentanenitrile).

15. The process of claim 2 wherein said molar ratio of styrene to maleic anhydride is 1:1 to 3:1.

16. The process of claim 2 wherein the styrene is α-methyl styrene.

17. The process of claim 2 wherein the styrene is vinyl toluene.

18. The process of claim 2 wherein said sulfonated copolymer is neutralized with sodium carbonate and recovered by filtration.

19. The process of claim 2 wherein water is added after sulfonation such that the sulfonated copolymer dissolves in the water and is separated and recovered in aqueous phase from the dichloroethane.

* * * * *